US012050969B2

(12) United States Patent
Vaid et al.

(10) Patent No.: US 12,050,969 B2
(45) Date of Patent: Jul. 30, 2024

(54) INTEGRATING DATA QUALITY ANALYSES FOR MODELING METRICS

(71) Applicant: Oracle International Corporation, Redwood Shores, CA (US)

(72) Inventors: Amit Vaid, Bengaluru (IN); Vijayalakshmi Krishnamurthy, Sunnyvale, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1047 days.

(21) Appl. No.: 16/921,579

(22) Filed: Jul. 6, 2020

(65) Prior Publication Data

US 2022/0004822 A1   Jan. 6, 2022

(51) Int. Cl.
*G06N 20/00* (2019.01)
*G06F 18/21* (2023.01)
*G06F 18/2113* (2023.01)

(52) U.S. Cl.
CPC ......... *G06N 20/00* (2019.01); *G06F 18/2113* (2023.01); *G06F 18/2193* (2023.01)

(58) Field of Classification Search
CPC ........ G06N 20/00; G06N 20/10; G06N 20/20; G06F 18/20; G06F 18/21; G06F 18/2113; G06F 18/213; G06F 18/2193
See application file for complete search history.

(56) References Cited

U.S. PATENT DOCUMENTS

| 10,235,629 | B2 | 3/2019 | Lemmer et al. |
| 2017/0055913 | A1 | 3/2017 | Bandyopadhyay et al. |
| 2017/0060988 | A1 | 3/2017 | Kudo et al. |
| 2017/0372232 | A1* | 12/2017 | Maughan ............... G06F 3/0482 |
| 2019/0065987 | A1 | 2/2019 | Lecue et al. |
| 2019/0188584 | A1* | 6/2019 | Rao .......................... G06Q 10/00 |
| 2019/0265971 | A1 | 8/2019 | Behzadi et al. |

(Continued)

FOREIGN PATENT DOCUMENTS

KR   10-2059112 B1   12/2019

OTHER PUBLICATIONS

Syafrudin et al., "Performance Analysis of IoT-Based Sensor, Big Data Processing, and Machine Learning Model for Real-Time Monitoring System in Automotive Manufacturing", Corpus ID: 52157457, Published 2018, 5 pages.

(Continued)

*Primary Examiner* — Shane D Woolwine
(74) *Attorney, Agent, or Firm* — Invoke

(57) ABSTRACT

Techniques for generating a composite score for data quality are disclosed. Univariate analysis is performed on a plurality of data points corresponding to each of a first feature, a second feature, and a third feature of a data set. The univariate analysis includes at least a first type of analysis generating a first score having a first range of possible values, and a second type of analysis generating a second score having a second range of possible values. A first quality score is computed for the data values for the first, second, and third features based on a normalized first score and a normalized second score. Machine learning is performed on the data points corresponding to one or both of the first feature and the second feature having a first quality score above a threshold value to model the third feature.

23 Claims, 8 Drawing Sheets

(56) References Cited

U.S. PATENT DOCUMENTS

2020/0279017 A1* 9/2020 Norton .................. G06N 3/045
2020/0327377 A1* 10/2020 Jaganathan .......... G06V 10/993

OTHER PUBLICATIONS

Xue et al., "DeepFusion: A Deep Learning Framework for the Fusion of Heterogeneous Sensory Data", Mobihoc '19, Jul. 2-5, 2019, pp. 151-160.

Zhong et al., "A Novel Sensor Data Pre-Processing Methodology for the Internet of Things Using Anomaly Detection and Transfer-by-Subspace-Similarity Transformation", Sensors, vol. 19, 2019, 4536, 26 pages.

* cited by examiner

INTEGRATING DATA QUALITY ANALYSES FOR MODELING METRICS

TECHNICAL FIELD

The present disclosure relates to integrating multiple different types of data analysis for a data set. In particular, the present disclosure relates to generating a composite data quality value for data health based on different types of data analysis to model a metric.

BACKGROUND

With the increase in the number of devices connected to the Internet, the Internet of Things (IoT) provides a broad data pool from which entities may obtain data to analyze processes. However, since data is drawn from many different types of devices and sensors, the data often lacks any uniform measurement of quality.

In an automated machine learning environment, the quality of business insights that can be drawn from any particular data set is highly dependent on the quality of data. However, ensuring high quality data for business modelling is left to exploratory analyses often subject to the maturity of an analyst.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. SYSTEM ARCHITECTURE
3. NORMALIZING MULTIPLE TYPES OF DATA ANALYSES
4. INTERACTIVE USER INTERFACE
5. EXAMPLE EMBODIMENT OF ANALYSIS OF DATASETS
6. EXAMPLE EMBODIMENT OF USER INTERFACE
7. COMPUTER NETWORKS AND CLOUD NETWORKS
8. MISCELLANEOUS; EXTENSIONS
9. HARDWARE OVERVIEW

1. General Overview

A data monitoring system may obtain data from a variety of sources and may analyze the data to improve a system. The data monitoring system determines the suitability of the data for data analysis by performing data health analyses on the data. The data monitoring system performs at least two different types of data health analyses for multiple different features in the data and normalizing the results. The data monitoring system computes a first quality score based on the normalized results of the data health analyses.

The data monitoring system further receives an input feature to be modeled or analyzed. The data monitoring system further performs a data health analysis of the input feature and performs a multivariate analysis on different features of the data to determine which features are most suitable for modeling or analyzing the third feature, and the data monitoring system provides an overall normalized score for each feature based on the multivariate analysis. The data monitoring system may then provide the overall normalized scores to a user in the form of a user display and recommendations for improving the data.

One or more embodiments described in this Specification and/or recited in the claims may not be included in this General Overview section.

2. Architectural Overview

A data monitoring system obtains data from multiple sources in multiple different formats and having different granularity. The data monitoring system analyzes the data for quality and provides a uniform measure of data quality to a user.

Figure 1:
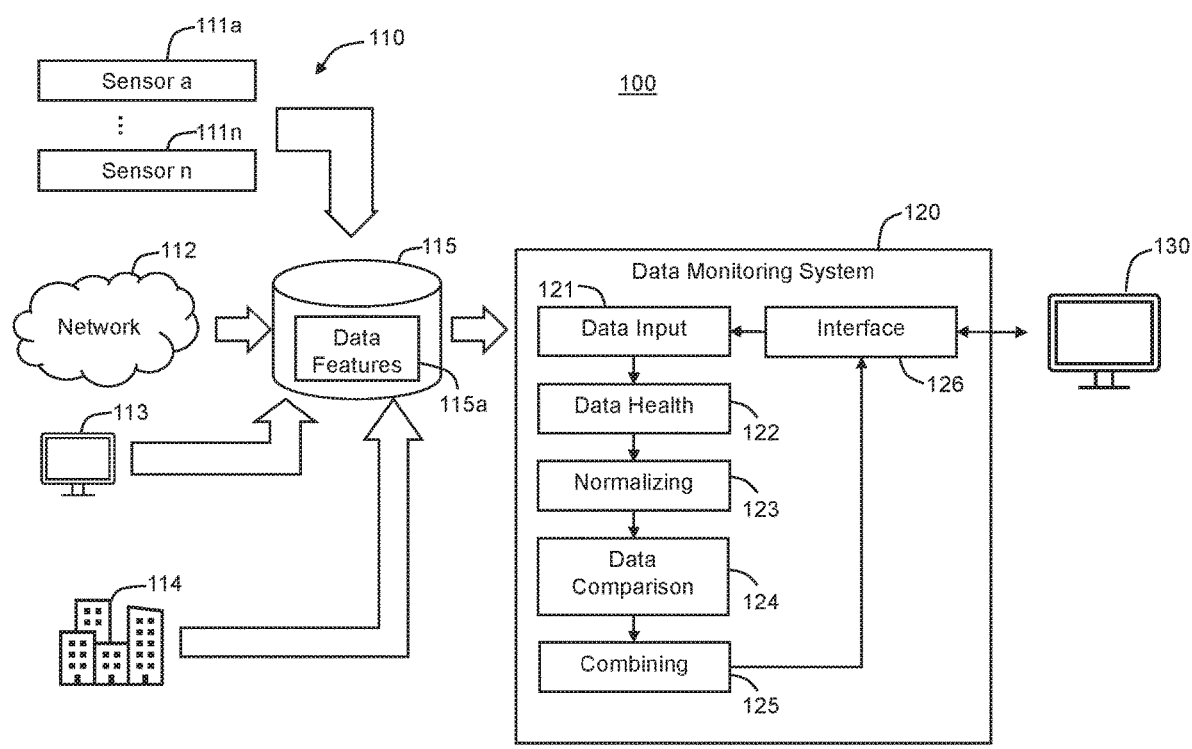
FIG. 1 illustrates a system in accordance with one or more embodiments.

FIG. 1 illustrates a system 100 in accordance with one or more embodiments. As illustrated in FIG. 1, system 100 includes one or more data sources 1110, a data monitoring system 120, and a user terminal 130.

Figure 5:
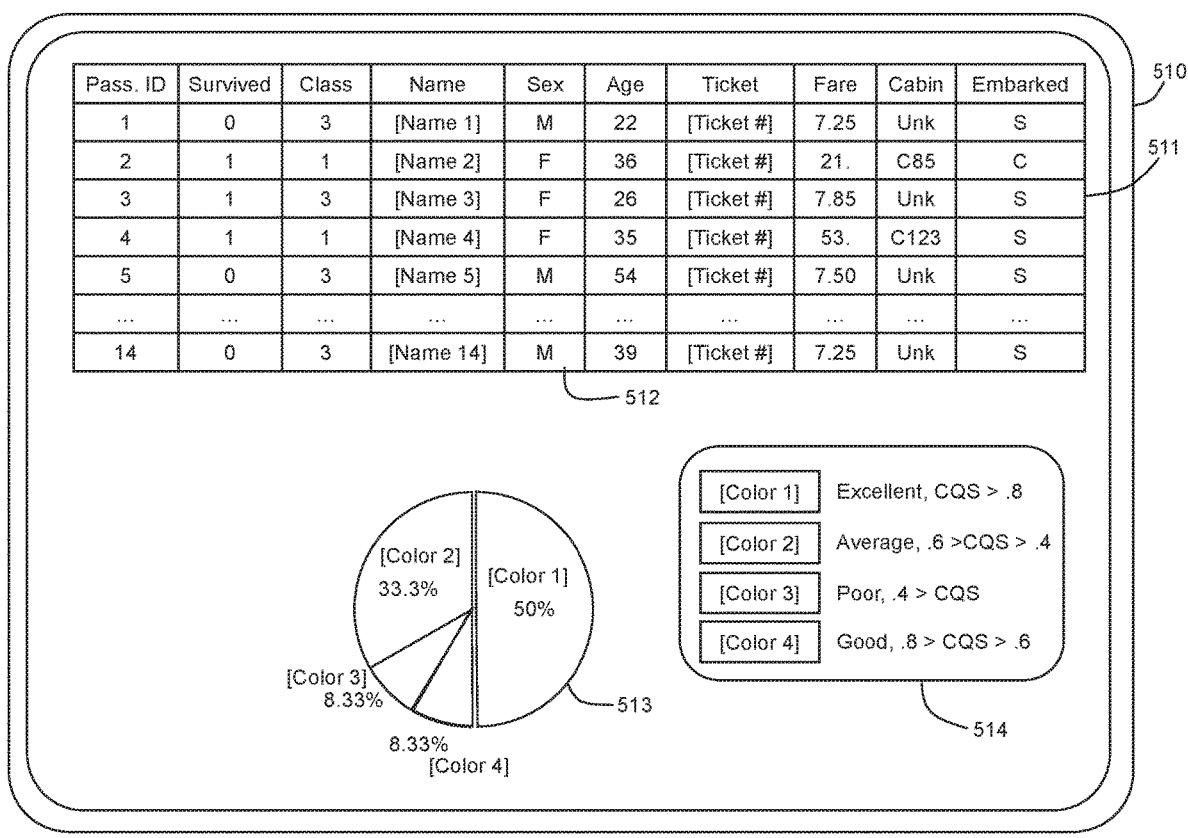
FIG. 5 illustrates a graphical user interface in accordance with one or more embodiments.

The data sources include sensors 111a to 111n, a network 112, a user terminal 113, and organizations 114. In one embodiment, the data sources are connected to the Internet or one or more additional/other networks. The data is stored in a data repository 115 and organized according to data features 115a. In the present specification and claims, a data feature is a grouping of data that provides a value associated with one characteristic. For example, FIG. 5 illustrates a data repository 115 including two tables 511 and 512, each representing a data set. Each table contains information regarding five features of "houses," where the rows in each table correspond to respective houses, and the columns correspond to the respective data features of the houses. In table 511, Feature 1 of a first house has a value "0.6"; Feature 2 has a value "Red"; Feature 3 has a value "3";

Feature 4 has a value "0.5"; and Feature 5 has a value "$500 k." In one example, Feature 1 corresponds to a neighborhood rating, Feature 2 corresponds to a home color, Feature 3 corresponds to a number of bedrooms, Feature 4 corresponds to a distance from a school, and Feature 5 corresponds to an estimated home price. These values are provided only by way of example, and embodiments of the invention encompass any number and variety of data features corresponding to any object, system, or process. For example, in another embodiment, data features may correspond to characteristics of computing systems. In the present specification and claims, a "data feature" refers to the set of values representing the same feature, represented as a column in FIG. 5, of one or more objects, systems, or processes, represented as rows in FIG. 5.

Data features 115*a* of embodiments of the invention are collected from a variety of sources and are stored together in data sets. For example, in the example embodiment of FIG. 5, Feature 1 may be obtained from social media website, Feature 2 may be obtained by user input from a user terminal, Feature 3 may be obtained from a real estate description on a website, Feature 4 may be obtained using a map service, and Feature 5 may be obtained by using a home value database. Embodiments of the invention are not limited to the data features shown in FIG. 5, but instead embodiments encompass any data features from any source configured to provide data features to the data monitoring system 120.

The data monitoring system 120 obtains one or more data sets including the data features 115*a* at a data input 121. The data input 121 may include, for example, one or more network connection modules configured to receive data input from outside devices. A data health module 122 performs an analysis of the quality of the data. The data health module 122 may analyze each data set using a univariate analysis. For example, the data health module 122 may determine whether data features include missing data, outlier values, skewness exceeding a threshold, a coefficient of variation that exceeds a threshold, or a kurtosis exceeding a threshold. In one embodiment, the data health module 122 generates a missing data score by calculating a fraction of missing values in each column of a data set to the total number of values in that column. In one embodiment, the data health module 122 generates an outlier score by calculating to what extend values of the data feature stray from a normal distribution. The data health module 122 may utilize interquartile ranges, for example, to determine a ratio of outliers to "normal" values in a column. In one embodiment, the data health module 122 generates a skewness score by determining a symmetry of a distribution of values of a data feature. The data health module 122 may provide a higher skewness score to a data feature having values that are distributed more symmetrically, and a lower skewness score to a data feature having values that are distributed less symmetrically.

In one embodiment, the data health module 122 generates a coefficient of variation score by determining how much data values of a data feature vary around a mean of all the data values in the data feature. In one embodiment, the data health module 122 generates a kurtosis score by measuring a combined weight of tails of a distribution of data values in a data feature relative to the rest of the distribution of data values in the data feature.

The data health module 122 may perform any additional univariate-type analyses to the data set. In embodiments of the invention, the data health module 122 performs two or more types of univariate analysis on each data feature of each data set. For example, in one embodiment, the data health module 122 generates a completeness score based on a determination of missing values in the data set and an outlier score based on a determination of a number and quality of outliers in the data set. A normalizing module 123 normalizes the different scores of the different univariate analyses to generate scores defined by a same range of values. In one embodiment, the normalizing module 123 converts the scores from the univariate analyses to fall within a range from 0 to 1. For example, in an embodiment in which a skewness score is in the tens, the kurtosis score is in the single digits, and the missing data score is a fraction having a value less than one, all of the scores may be normalized to have a value between 0 and 1.

A data comparison module 124 performs bivariate and multivariate analysis of the data set by comparing two different data features. For example, the data comparison module 124 compares to different data features to determine cross-feature effects, correlations, and feature importance. In one embodiment, the data comparison module 124 determines cross-feature effects by comparing values of two or more columns to determine whether two or more data features capture the same information. For example, if one data feature captures a zip code and another captures a city name, the data comparison module 124 may score one of the data features negatively to avoid duplicative data. In one embodiment, the data comparison module 124 analyzes two or more data features to generate a correlation score representing an inter-relatedness of the two data features. For example, if a value-to-be-modeled is "home price," and the data comparison module 124 determines that a value "red" of one data feature correlates with a higher home price, the data comparison module 124 may generate a higher correlation score for the data feature representing house color than for another data feature that does not have a correlation with the home price. In one embodiment, the data comparison module 124 generates a "feature importance" score by comparing correlations to determine which feature correlations are the most important. For example, if the data comparison module 124 determines that both the "home color" feature and "number of bedrooms" feature correspond to the "home price," but that the "number of bedrooms" feature corresponds more strongly to the "home price," then the data comparison module 124 gives the "number of bedrooms" feature a high "feature importance" score.

A combining module 125 combines the univariate, bivariate, and multivariate scores associated with each data feature to generate a Quality Score for each feature and provides the Quality Score to the interface 126. The interface 126 generates a graphical user interface (GUI) or other display to allow a user to view and interact with the GUI to view and understand the analyzed data. The interface 126 may also include one or more communications modules, such as wired or wireless transmitters and receivers to communicate with a user terminal 130 to allow the user to view the analyzed data and interact with the data monitoring system.

In one or more embodiments, the system 100 may include more or fewer components than the components illustrated in FIG. 1. The components illustrated in FIG. 1 may be local to or remote from each other. The components illustrated in FIG. 1 may be implemented in software and/or hardware. Each component may be distributed over multiple applications and/or machines. Multiple components may be combined into one application and/or machine. Operations described with respect to one component may instead be performed by another component.

Additional embodiments and/or examples relating to computer networks are described below in Section 7, titled "Computer Networks and Cloud Networks."

In one or more embodiments, a data repository 115 is any type of storage unit and/or device (e.g., a file system, database, collection of tables, or any other storage mechanism) for storing data. Further, a data repository 115 may include multiple different storage units and/or devices. The multiple different storage units and/or devices may or may not be of the same type or located at the same physical site. Further, a data repository 115 may be implemented or may execute on the same computing system as the data monitoring system 120. Alternatively or additionally, a data repository 104 may be implemented or executed on a computing system separate from the data monitoring system 120. A data repository 104 may be communicatively coupled to the data monitoring system 120 via a direct connection or via a network.

In one or more embodiments, the data monitoring system 120 refers to hardware and/or software configured to perform operations described herein for analyzing and presenting data. Examples of operations for analyzing data from multiple sources, normalizing the analyzed data, and providing a user interface to aid a user in understanding the analyzed data are described below with reference to FIG. 2.

In an embodiment, the data monitoring system 120 is implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant ("PDA"), a wireless receiver and/or transmitter, a base station, a communication management device, a router, a switch, a controller, an access point, and/or a client device.

In one or more embodiments, interface 126 refers to hardware and/or software configured to facilitate communications between a user and the data monitoring system 120. The interface 126 renders user interface elements and receives input via user interface elements. Examples of interfaces include a graphical user interface (GUI), a command line interface (CLI), a haptic interface, and a voice command interface. Examples of user interface elements include checkboxes, radio buttons, dropdown lists, list boxes, buttons, toggles, text fields, date and time selectors, command lines, sliders, pages, and forms.

In an embodiment, different components of interface 126 are specified in different languages. The behavior of user interface elements is specified in a dynamic programming language, such as JavaScript. The content of user interface elements is specified in a markup language, such as hypertext markup language (HTML) or XML User Interface Language (XUL). The layout of user interface elements is specified in a style sheet language, such as Cascading Style Sheets (CSS). Alternatively, interface 126 is specified in one or more other languages, such as Java, C, or C++.

In one or more embodiments, a tenant (such as tenant 112 and/or tenant 114) is a corporation, organization, enterprise or other entity that accesses a shared computing resource, such as application 116. In an embodiment, tenant 112 and tenant 114 are independent from each other. A business or operation of tenant 112 is separate from a business or operation of tenant 114.

3. Normalizing Multiple Types of Data Analyses

Figure 2A:
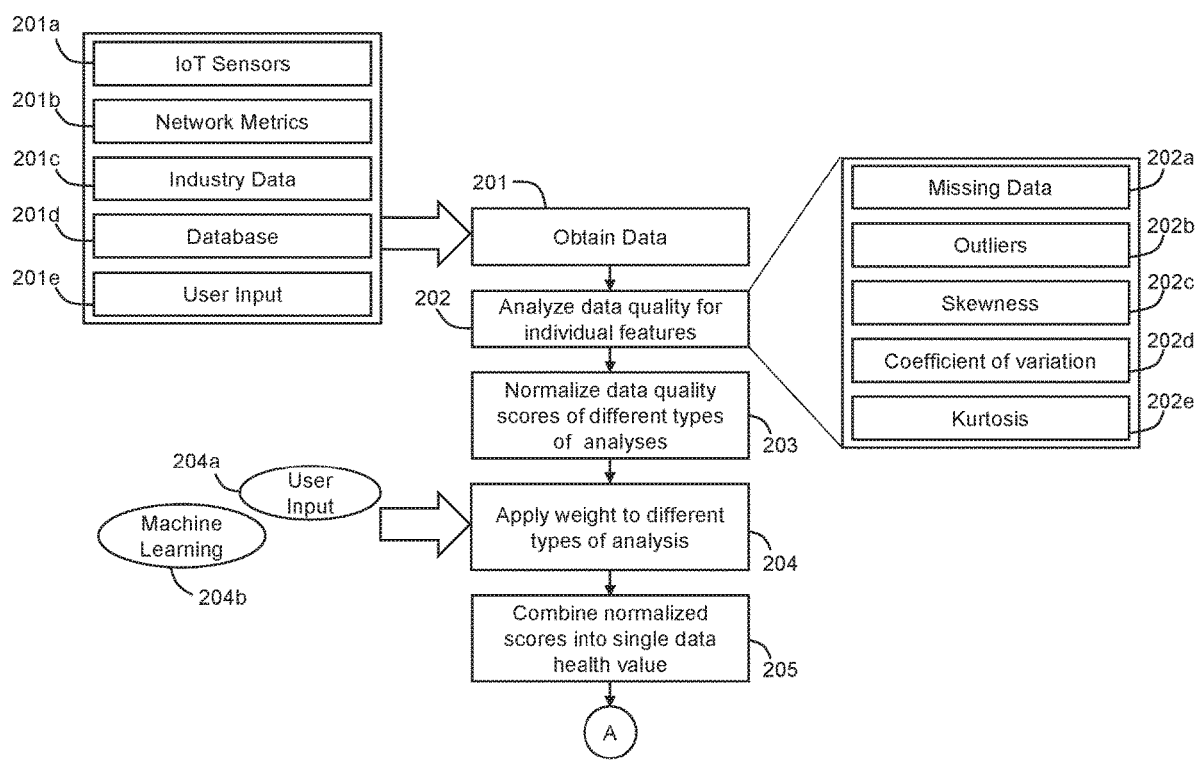
FIGS. 2A and 2B illustrate an example set of operations for analyzing data quality in accordance with one or more embodiments.
Figure 2B:
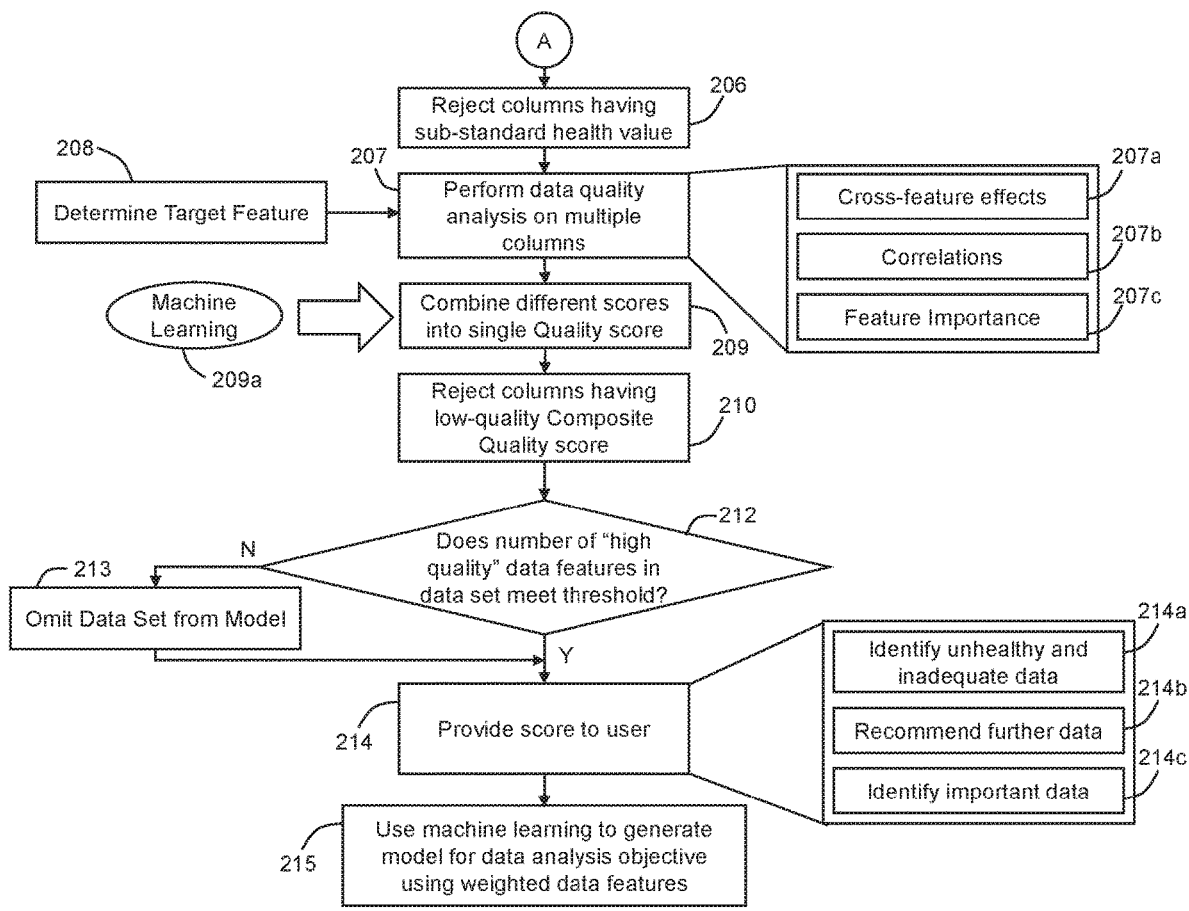

FIGS. 2A and 2B illustrate an example set of operations for normalizing multiple types of data analyses in accordance with one or more embodiments. One or more operations illustrated in FIG. 2 may be modified, rearranged, or omitted all together. Accordingly, the particular sequence of operations illustrated in FIG. 2 should not be construed as limiting the scope of one or more embodiments.

A data monitoring system may be in communication with one or more data repositories that collect and store data from various sources, including sensors, networks, databases, user terminals, etc. The data monitoring unit obtains a set of data defined by a user or system (Operation 201). For example, the data monitoring unit may obtain data from sensors connected to various devices in communication with the Internet (Internet-of-things sensors 201a), network metrics 201b, such as data storage, power consumption, etc.; industry data 201c, such as prices, products, etc.; data stored in databases 201d, and data from a user input 201e, such as data entered manually by a user. The data is organized by into data features, such if the data is represented as a table having rows and columns, as shown in FIG. 5, each row corresponds to a described object (which may also be a method, process, system, etc.), and each column includes a value representing a feature of the described object. Accordingly, each column is described in the present specification and claims as a "data feature." Each column includes values associated with multiple described objects. A table of multiple described objects, each having multiple features, is referred to in the present specification and claims as a data set.

The data monitoring unit analyzes the data to determine a quality of the data (Operation 202). The data monitoring unit first analyzes each column of the data set using a univariate analysis. The data monitoring unit may determine whether data features include missing data, outlier values, skewness exceeding a threshold, a coefficient of variation that exceeds a threshold, or a kurtosis exceeding a threshold. The data monitoring unit generates a missing data score by calculating a fraction of missing values in each column of a data set to the total number of values in that column. The data monitoring unit generates an outlier score by calculating to what extend values of the data feature stray from a normal distribution. The data monitoring unit may utilize interquartile ranges, for example, to determine a ratio of outliers to "normal" values in a column. The data monitoring unit generates a skewness score by determining a symmetry of a distribution of values of a data feature. The data monitoring unit may provide a higher skewness score to a data feature having values that are distributed more symmetrically, and a lower skewness score to a data feature having values that are distributed less symmetrically.

The data monitoring unit generates a coefficient of variation score by determining how much data values of a data feature vary around a mean of all the data values in the data feature. The data monitoring unit generates a kurtosis score by measuring a combined weight of tails of a distribution of data values in a data feature relative to the rest of the distribution of data values in the data feature.

The data monitoring unit may perform any additional univariate-type analyses to the data set. In embodiments of the invention, the data monitoring unit performs two or more types of univariate analysis on each data feature of each data set. For example, in one embodiment, the data monitoring unit generates a completeness score based on a determination of missing values in the data set and an outlier score based on a determination of a number and quality of outliers in the data set.

The data monitoring unit normalizes the different scores of the different univariate analyses to generate scores defined by a same range of values (Operation 203). In one embodiment, the data monitoring unit converts the scores from the univariate analyses to fall within a range from 0 to 1. For example, in an embodiment in which a skewness score is in the tens, the kurtosis score is in the single digits, and the missing data score is a fraction having a value less than one, all of the scores may be normalized to have a value between 0 and 1.

The data monitoring unit applies a weighted value to the two or more types of univariate analyses (Operation 204). The weighted value may be provided by user input 204a, by a machine learning process 204b, or by any other method. For example, in a machine learning process, the data monitoring unit may determine based on multiple analyses over time that an outlier score for data features has a greater influence on data quality than a kurtosis score. Accordingly, the data monitoring unit would apply a greater weighted value to the outlier score than the kurtosis score for each data feature.

The data monitoring unit combines all of the normalized scores for each column, or data feature, into a single composite health score (Operation 205). In one embodiment, the data monitoring unit averages the weighted and normalized values to generate the composite health score for each column, or each data feature.

The data monitoring unit may determine whether the composite health scores for each column meet a predetermined threshold. If they do not, the data monitoring unit may reject the column from further analysis (Operation 206). In one embodiment, the data monitoring unit notifies a user of the columns having the composite health score beneath a threshold to allow the user or system operator to obtain additional data.

The data monitoring unit performs further data quality analysis on the columns, including bi-variate and multi-variate analysis (Operation 207). The data monitoring unit identifies a target feature (Operation 208) and performs the bi-variate and multi-variate analysis based on the identified target feature.

Examples of bi-variate analysis include identifying cross-feature effects 207a and correlations 207b between data features or columns. An example of a multi-variate analysis includes determining feature importance 207c among the data features or columns. The data monitoring unit determines cross-feature effects by comparing values of two or more columns to determine whether two or more data features capture the same information. The data monitoring unit analyzes two or more data features to generate a correlation score representing an inter-relatedness of the two data features. The data monitoring unit generates a "feature importance" score by comparing correlations to determine which feature correlations are the most important. For example, the data monitoring unit may determine that two data features have a relationship with a target feature, and a first data feature may be giving a higher feature importance value based on the first data feature having a stronger correlation than the second data feature to the target feature.

In one embodiment, the "target feature" is a feature, or column, in the data set being analyzed. A user or system may designate the target feature to be modeled to identify whether current performance of a system is acceptable, to identify trends in a system, to determine recommendations for adjustments in a system, or to predict future data points. The remaining data features, or columns, in the data set may then be compared with the target feature, with bivariate and multi-variate analysis, to obtain a Composite Quality score (Operation 209). In other words, the Composite Quality score for each data feature, or column, of a data set is a normalized and composite value of the multiple different univariate, bivariate, and multivariate analysis of the respective data features.

In one or more embodiments, the data monitoring unit utilizes machine learning to determine the features that have the greatest influence on the target feature, or that are most accurately model the target feature (Operation 209a). The data monitoring unit may assign weights to the different features so that the features having the greatest influence on modeling the target feature also have the greatest influence on the Composite Quality score.

The data monitoring unit compares the Composite Quality score of each data feature, or column, with a Composite Quality threshold score. The Composite Quality threshold is a value below which the data feature is considered "low-quality." When the data monitoring unit determines that a data value is "low quality," the data value may not be used to model the Target Feature (Operation 210). If the Composite Quality score does meet the threshold, the data feature may be considered "high quality" and may be used to model the Target Feature.

The data monitoring unit may also determine a number or percentage of data features, or columns, in a data set that are "high quality" and may compare the number of "high quality" data features with a predetermined data set threshold (Operation 212). The data set threshold may define a minimum number, or percentage, of "high quality" data features in a data set that is acceptable to generate a model of the Target Feature. If the number of "high quality" data features does not meet the threshold, the data monitoring unit determines the dataset should not be used to model the Target Feature (213). However, if the number of "high quality" data features meets the threshold, the data set is used to generate a model of the Target Feature.

In each case, the Composite Quality Scores for each data feature are provided to a user (Operation 214). The data monitoring unit may provide the user with a graphical user interface (GUI) or other informational display to allow the user to see a single score, representing the composite values of the univariate, bivariate, and multivariate data analyses, for each data feature in a data set.

In one or more embodiments, the data monitoring unit further provides the user with an indication of which sets of data are considered "low quality" based on Composite Quality scores that are below a predetermined threshold (Operation 214a). The data monitoring unit may recommend to a user one or more data features for which additional data should be obtained to achieve a higher Composite Quality score (Operation 214b). The data monitoring unit may also identify for a user "important" data, or data that should be a priority for the user to obtain to improve a model of the Target feature (Operation 214c).

The data monitoring unit uses the data set to generate a model of the Target Feature (Operation 215). In one embodiment, the data monitoring unit utilizes machine learning and applies the data set to obtain or modify variables to model the Target Feature. The data monitoring unit may generate the model of the Target Feature to determine whether current performance of a system is acceptable, to identify trends in the system, to determine recommendations for adjustments in the system, or to predict future data points of the Target Feature.

4. Interactive User Interface

Figure 3:
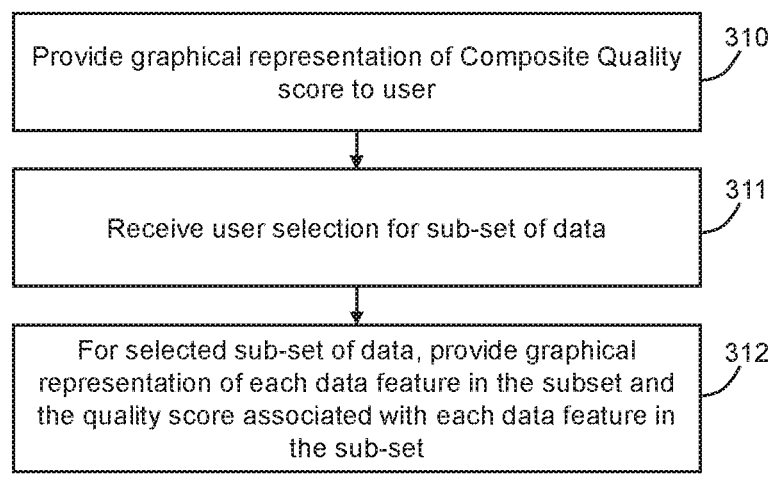
FIG. 3 illustrates an example set of operations for providing a user interface in accordance with one or more embodiments.

FIG. 3 illustrates an example set of operations for providing an interactive user interface in accordance with one or more embodiments. One or more operations illustrated in FIG. 3 may be modified, rearranged, or omitted all together. Accordingly, the particular sequence of operations illustrated in FIG. 3 should not be construed as limiting the scope of one or more embodiments.

A user interface provides a graphical representation of a Composite Quality score of multiple data features of a data set to a user (Operation 310). Examples of graphical representations of the Composite Quality scores includes one or more charts, lists, icons, or text displayed visually or provided through any medium discernable to a user. The graphical representation may be an overview of the data set, and may be divided, for example, according to the quality of the data.

The user interface receives a user selection for a sub-set of the data (Operation 311). For example, a user may position a cursor over a section of a chart, and select the section to view more details about the one or more data features associated with the section.

The user interface provides an additional graphical representation to the user with more detailed information about the one or more data features selected by the user (Operation 312). For example, a user may select a portion of a graph corresponding to "low quality," and the user interface may provide to the user a list of names of data features and a quality score associated with each data feature. The user interface may also provide information regarding why a Composite Quality score is of a certain value. For example, if a user selects "low quality" the user interface may display information indicating "Feature 1" has a large amount of missing data, or is not correlated with a Target Feature.

In one embodiment, the user interface allows a user to select which data features to provide in a model for a Target Feature. In one embodiment, the user interface displays to a user one or more recommendations in connection with a data set, such as an indication of which data features should be added, omitted, or supplemented with additional data values to generate a model for a Target Feature.

5. Example Embodiment of Analysis of Datasets

A detailed example is described below for purposes of clarity. Components and/or operations described below should be understood as one specific example which may not be applicable to certain embodiments. Accordingly, components and/or operations described below should not be construed as limiting the scope of any of the claims.

Figure 4:
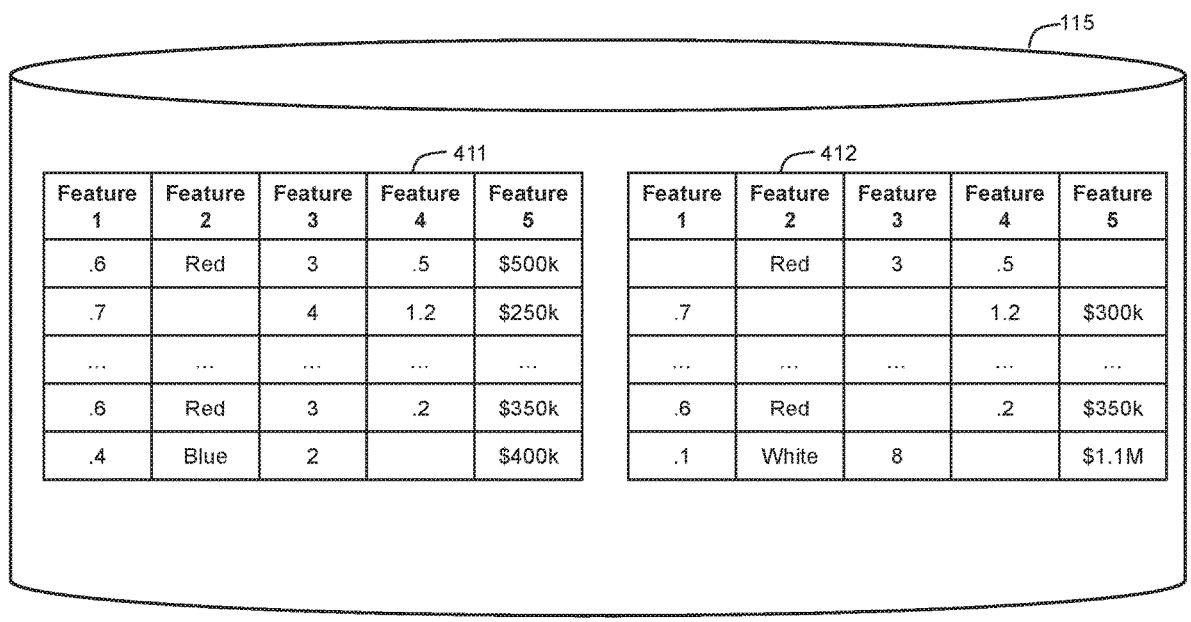
FIG. 4 illustrates tables representing data features in accordance with one or more embodiments.

FIG. 4 illustrates a data repository 115 having a first table, or data set 411, and a second table, or data set 412. In the example of FIG. 4, the data sets each include data related to "homes" and the feature "home prices" (Feature 5) is identified as the Target Feature.

In embodiments of the invention, a data monitoring unit performs a univariate analysis on each of the columns in each data set 411 and 412 to determine a "data health value" for each column. The data health value is based on two or more univariate analyses, including missing data, outlier values, skewness, a coefficient of variation, and kurtosis. For example, the data monitoring unit may determine that out of ten rows, Feature 3 of data set 412 includes only four values. Accordingly, the data monitoring unit may assign Feature 3 with a high "missing data" value. In addition, the data monitoring unit may determine that Feature 5 of data set 412 has a high number of outlier values, and may assign Feature 5 with a high "outlier" score. The data monitoring unit performs at least two univariate analyses of each data feature (Feature 1 to Feature 5), normalizes the values to have the same range of possible values, and generates a data health value for each column based on a combination of the normalized values of the univariate analyses.

The data monitoring unit may determine that the data health value of Feature 3 of data set 412 is too low, and may omit the Feature 3 from a machine learning process for generating a model of the Target Feature.

Next, the data monitoring unit performs a bi-variate and multi-variate analysis of the data features of data sets 411 and 412. The data monitoring unit analyzes two or more data features, including the Target Feature (Feature 5), to analyze cross-feature effects, correlations, and feature importance. For example, the data monitoring unit may determine that Feature 3 has a high correlation with the Target Feature, Feature 5, and is also important to Feature 5. Accordingly, Feature 3 is given a high "feature importance" value. On the other hand, Feature 2 has a low correspondence with Feature 5 and is therefore given a low "feature importance" value. Based on the combined univariate, bi-variate, and multi-variate analysis, the data monitoring unit generates a Composite Quality score for each data feature (Features 1-5) of the data sets 411 and 412. The data monitoring unit may determine that a Composite Quality score for Feature 2 of data sets 411 and 412 falls below a certain threshold, and so Feature 2 would not be used to model the Target Feature. In addition, the data monitoring unit may determine that columns corresponding to data Feature 3 and Feature 5 of data set 412 have Composite Quality scores below the predetermined threshold. The data monitoring unit may further determine that too many columns of data set 412 fall below a "high quality" threshold, and so data set 412 would not be used to model the Target Feature.

The data monitoring unit may display information regarding data sets 411 and 412 to a user, to allow the user to see the Composite Quality scores for each data feature and additional detail regarding the data features. The data monitoring unit may further use the data set 411 to generate a model for the Target Feature by machine learning.

6. Example Embodiment of User Interface

A detailed example is described below for purposes of clarity. Components and/or operations described below should be understood as one specific example which may not be applicable to certain embodiments. Accordingly, components and/or operations described below should not be construed as limiting the scope of any of the claims.

FIG. 5 illustrates a graphical user interface (GUI) according to one embodiment. A display device 510 displays a GUI 511 including data feature information 512 and a graph 513 providing a user with a visual image of a Composite Quality values for data features of a data set. The graph 513 includes divisions representing "excellent quality," "good quality," "average quality," and "poor quality." As discussed above, the measures of quality are based on a composite normalized value of univariate, bivariate, and multivariate analyses of the data features. In embodiments of the invention, the graph 513 representing the divisions of quality of the data features in the data set may be divided by one or more of size, shape, and color. A user selects a portion of the graph to obtain additional information about the data features associated with that portion. A key 514 provides information regarding the Composite Quality values for each division of the graph 513.

Figure 6:
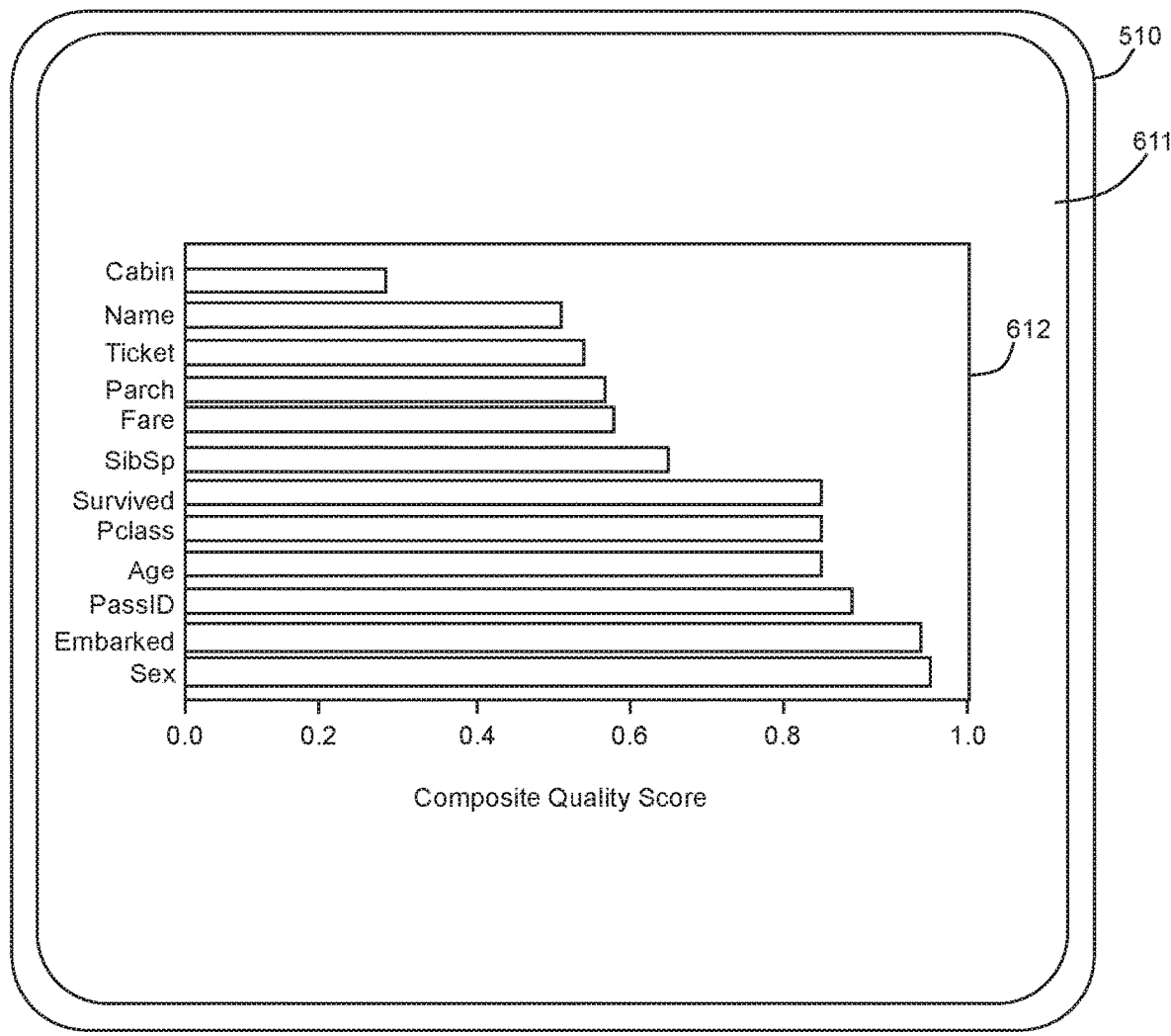
FIG. 6 illustrates a graphical user interface in accordance with one or more embodiments.

FIG. 6 illustrates a GUI 611 of a graph 612 providing detailed information of the data features in the data set corresponding to FIG. 5. As shown in FIG. 6, each data feature (i.e. "cabin," "name," etc.) is associated with a Composite Quality score. The composite quality score is normalized to fall within a range from 0 to 1. However, embodiments of the invention are not limited to this normalized range. For example, a Composite Quality score may have a range from 0 to 10, 0 to 100, or any other predetermined range.

Based on the graphical display of the GUI 611, a user may observe which data is the most useful to model a Target Feature. In addition, in one or more embodiments, a user may select a graphical representation of the data features in the graph 612 to obtain still more detailed information corresponding to the individual univariate, bivariate, and multi-variate analyses that make up the Composite Quality score. For example, selecting "Cabin" in the graph 612 may result in a display of a data health value as well as a "feature importance" value, indicating that the "cabin" did not have a strong correlation with the Target Feature, resulting in a low Composite Quality score.

By providing a user with a graphical representation of a combination of data analysis methods, users are able to quickly understand the strengths and weaknesses of a data set without having to understand the underlying data analyses that determine the strengths and weaknesses of the data set. By providing the user with a normalized composite value representing the quality of data, the user may quickly understand the relative quality of data in a dataset without having to understand the separate univariate, bivariate, and multivariate analyses behind the data quality measurements. In addition, by providing a user with an interactive user interface for the dataset, a user may obtain recommendations for improving a data set to model a target feature.

7. Computer Networks and Cloud Networks

In one or more embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is tagged with a tenant ID. A tenant is permitted access to a particular network resource only if the tenant and the particular network resources are associated with a same tenant ID.

In an embodiment, each tenant is associated with a tenant ID. Each application, implemented by the computer network, is tagged with a tenant ID. Additionally or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In an embodiment, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

8. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

9. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 7:
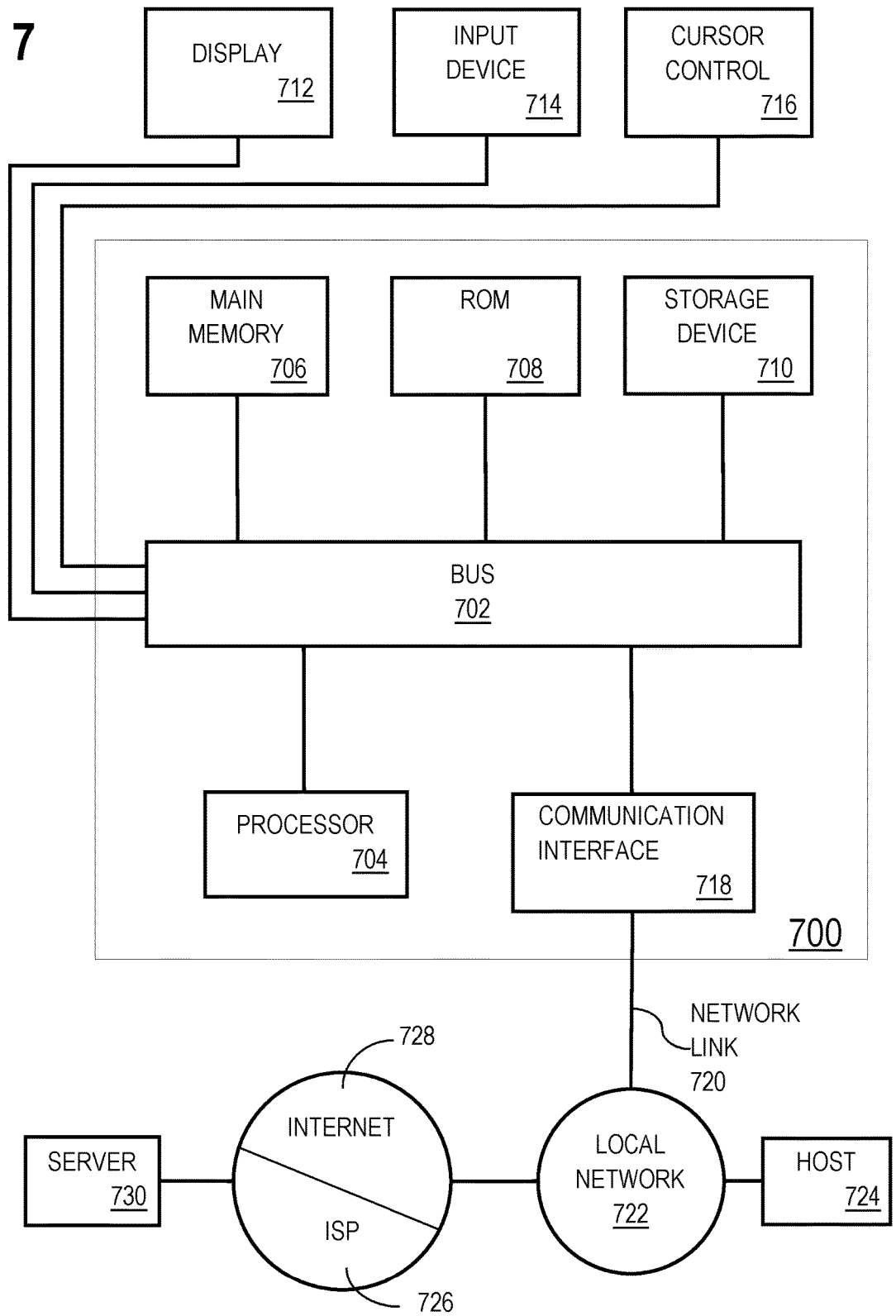
FIG. 7 shows a block diagram that illustrates a computer system in accordance with one or more embodiments.

For example, FIG. 7 is a block diagram that illustrates a computer system 700 upon which an embodiment of the invention may be implemented. Computer system 700 includes a bus 702 or other communication mechanism for communicating information, and a hardware processor 704 coupled with bus 702 for processing information. Hardware processor 704 may be, for example, a general-purpose microprocessor.

Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Such instructions, when stored in non-transitory storage media accessible to processor 704, render computer system 700 into a special-purpose machine that is customized to perform the operations specified in the instructions.

Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

Computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor 704 executing one or more sequences of one or more instructions contained in main memory 706. Such instructions may be read into main memory 706 from another storage medium, such as storage device 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 710. Volatile media includes dynamic memory, such as main memory 706. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. One or more non-transitory machine-readable media storing instructions which, when executed by one or more processors, cause performance of operations comprising:
    obtaining a first data set comprising a plurality of data points corresponding to a set of features;
    determining a first data health value corresponding to a suitability of the first data set for training a data model for predicting one or more data values at least by:
        computing a first univariate measurement of data quality for data values for a first feature across the plurality of data points, wherein the first univariate measurement comprises a completeness score that is based at least on missing values among the data values for the first feature;
        computing a second univariate measurement of data quality for data values for the first feature across the plurality of data points, wherein the second univariate measurement comprises an outlier score based at least on outlier values among the data values for the first feature; and
        computing a first quality score for the data values for the first feature based on at least the completeness score and the outlier score;
    based on determining the first data health value does not meet a threshold value, performing at least one remediation action to modify the first data set to generate a second data set;
    determining a second data health value corresponding to a suitability of the second data set for training the data model; and
    based on determining the second data health value meets the threshold value, training the data model with the second data set.

2. The one or more non-transitory machine-readable media of claim 1, wherein the operations further comprise:
    applying a set of rules to the first quality score for the data values for the first feature to determine a weight for the first feature; and
    computing an overall quality score for the plurality of data points based at least on (a) the first quality score for the first feature and (b) the weight for the first feature.

3. The one or more non-transitory machine-readable media of claim 1, wherein the operations further comprise:
    computing an overall quality score for the plurality of data points based at least on respective quality scores for data values for each feature of the set of features and respective weights associated with each feature of the set of features; and
    applying machine learning rules to adjust the respective weights associated with each feature of the set of features based on the respective quality scores for the data values for each feature of the set of features.

4. The one or more non-transitory machine-readable media of claim 1, wherein the operations further comprise:
    computing a third univariate measurement of data quality for data values for the first feature across the plurality of data points, wherein the third univariate measurement comprises one of:
        a skewness score representing a skewness of the data values for the first feature;
        a coefficient of variation score representing a coefficient of variation of the data values for the first feature; or
        a kurtosis score representing a kurtosis of the data values for the first feature.

5. The one or more non-transitory machine-readable media of claim 1, wherein the operations further comprise:
    computing a second quality score for the data values for a second feature of the first data set;
    obtaining a target feature identifying a metric to be modeled by analyzing the set of features;
    computing a first multivariate measurement on the data values for the first feature by comparing the data values of the first feature to data values of one of the target feature and the second feature;
    normalizing the first multivariate measurement to generate a normalized third score having a same possible range of values first quality score; and
    generating a third quality score for the first feature based on the first quality score and the normalized third score.

6. The one or more non-transitory machine-readable media of claim 5, wherein the first multivariate measurement includes one of:
    a measurement of cross-feature effects between the first feature and one of the target feature and the second feature;
    a measurement of correlations between the first feature and the target feature and between the second feature and the target feature; and
    a measurement of an importance of the first feature relative to the second feature in modeling the target feature based on a comparison of the correlations between (a) the first feature and the target feature and (b) the second feature and the target feature.

7. The one or more non-transitory machine-readable media of claim 5, wherein the operations further comprise:
    providing to a user display a graphical representation of the third quality score of each feature of the first data set.

8. The one or more non-transitory machine-readable media of claim 7, wherein the operations further comprise:
    providing to the user a recommendation, based on the third quality score, to modify the first data set, the recommendation comprising at least one of:
        omitting the data values of the second feature of the set of features based on the second quality score of the second feature being below a second threshold;
        obtaining additional data points for a third feature of the set of features based on the third feature having a first quality score below a first threshold and a second quality score equal to or greater than the second threshold; and
        obtaining additional data points for a fourth feature of the set of features based on the fourth feature having an importance in modeling a target feature provided by the user, wherein the importance is determined based on a correlation between the fourth feature and the target feature.

9. The one or more non-transitory machine-readable media of claim 5, wherein the operations further comprise:
generating the third quality score for a plurality of data features among the set of features;
identifying a number of the plurality of data features having the third quality score that meets a predetermined threshold; and
generating a model of a metric corresponding to the target feature by applying machine learning to the plurality of data features having the third quality score that meets the predetermined threshold.

10. The one or more non-transitory machine-readable media of claim 1, wherein computing the first quality score comprises:
normalizing the first univariate measurement to generate a normalized first score and normalizing the second univariate measurement to generate a normalized second score, the normalized first score and the normalized second score having a same possible range of values; and
computing the first quality score based on the normalized first score and the normalized second score.

11. The one or more non-transitory machine-readable media of claim 1, wherein the operations further comprise:
generating a model to analyze the first data set; and
responsive to determining that the first quality score does not meet a threshold value, omitting the first feature from the model.

12. The one or more non-transitory machine-readable media of claim 1, wherein the operations further comprise:
generating a model to analyze the first data set; and
responsive to determining that the first quality score does meets a threshold value, including the first feature in the model.

13. A method, comprising:
obtaining a first data set comprising a plurality of data points corresponding to a set of features;
determining a first data health value corresponding to a suitability of the first data set for training a data model for predicting one or more data values at least by:
computing a first univariate measurement of data quality for data values for a first feature across the plurality of data points, wherein the first univariate measurement comprises a completeness score that is based at least on missing values among the data values for the first feature;
computing a second univariate measurement of data quality for data values for the first feature across the plurality of data points, wherein the second univariate measurement comprises an outlier score based at least on outlier values among the data values for the first feature; and
computing a first quality score for the data values for the first feature based on at least the completeness score and the outlier score;
based on determining the first data health value does not meet a threshold value, performing at least one remediation action to modify the first data set to generate a second data set;
determining a second data health value corresponding to a suitability of the second data set for training the data model; and
based on determining the second data health value meets the threshold value, training the data model with the second data set,
wherein the method is executed by at least one device including a hardware processor.

14. The method of claim 13, further comprising:
computing a skewness score for the data values for the first feature across the plurality of data points; and
normalizing the skewness score to generate a normalized skewness score defined by the same range of possible values as a normalized completeness score,
wherein computing the first quality score includes computing the first quality score for the data values for the first feature based on at least the normalized completeness score, a normalized outlier score, and the normalized skewness score.

15. The method of claim 13, further comprising:
computing a coefficient of variation score for the data values for the first feature across the plurality of data points; and
normalizing the coefficient of variation score to generate a normalized coefficient of variation score defined by the same range of possible values as a normalized completeness score,
wherein computing the first quality score includes computing the first quality score for the data values for the first feature based on at least the normalized completeness score, a normalized outlier score, and the normalized coefficient of variation score.

16. The method of claim 13, further comprising:
computing a kurtosis score for the data values for the first feature across the plurality of data points; and
normalizing the kurtosis score to generate a normalized kurtosis score defined by the same range of possible values as a normalized completeness score,
wherein computing the first quality score includes computing the first quality score for the data values for the first feature based on at least the normalized completeness score, a normalized outlier score, and the normalized kurtosis score.

17. The method of claim 13, further comprising:
computing the completeness score and the outlier score for the data values for two or more features among the set of features;
normalizing the completeness score and the outlier score for the two or more features;
computing the first quality score for the two or more features;
comparing the first quality score for each of the two or more features with a first threshold; and
determining a second feature of the two or more features as being unfit for use in a calculation based on the second feature having a first quality score below the first threshold.

18. The method of claim 13, further comprising:
computing the completeness score and the outlier score for the data values for two or more features among the set of features;
normalizing the completeness score and the outlier score for the two or more features;
computing the first quality score for the two or more features;
obtaining a target feature identifying a metric to be modeled by analyzing the set of features;
performing one of a bivariate analysis and a multivariate analysis on the data values for the two or more features and the target feature; and generating a second quality score for each of the two or more features based on the bivariate analysis or the multivariate analysis.

19. The method of claim 18, wherein the one of the bivariate analysis and the multivariate analysis includes an analysis of cross-feature effects between at least two of the two or more features.

20. The method of claim 18, wherein the one of the bivariate analysis and the multivariate analysis includes an analysis of correlations between at least two of the two or more features.

21. The method of claim 18, wherein the one of the bivariate analysis and the multivariate analysis includes an analysis of an importance of each of the two or more features in modeling the target feature based on a comparison of the at least two of the two or more features, wherein the importance is determined based on a correlation between the two or more features and the target feature.

22. The method of claim 18, further comprising:
providing to a user display the second quality score for each of the two or more features.

23. The method of claim 22, further comprising:
providing to the user a recommendation, based on the second quality score, to modify the first data set, the recommendation comprising at least one of:
omitting the data values of a second feature of the set of features based on the second feature having a second quality score below a second threshold;
obtaining additional data points for a third feature of the set of features based on the third feature having a first quality score below a first threshold and a second quality score equal to or greater than the second threshold; and
obtaining additional data points for a fourth feature of the set of features based on the fourth feature having an importance in modeling a target feature provided by the user, wherein the importance is determined based on a correlation between the fourth feature and the target feature.

* * * * *

UNITED STATES PATENT AND TRADEMARK OFFICE
CERTIFICATE OF CORRECTION

| | | |
|---|---|---|
| PATENT NO. | : 12,050,969 B2 | Page 1 of 1 |
| APPLICATION NO. | : 16/921579 | |
| DATED | : July 30, 2024 | |
| INVENTOR(S) | : Vaid et al. | |

It is certified that error appears in the above-identified patent and that said Letters Patent is hereby corrected as shown below:

On the Title Page

Column 2, item [56], Line 1, delete "loT-Based" and insert -- IoT-Based --, therefor.

Signed and Sealed this
Tenth Day of December, 2024

Katherine Kelly Vidal
*Director of the United States Patent and Trademark Office*